US010039979B2

(12) United States Patent
Perry

(10) Patent No.: US 10,039,979 B2
(45) Date of Patent: Aug. 7, 2018

(54) CAPTURING ASYNCHRONOUS COMMENTARY TO PRE-RECORDED GAMEPLAY

(71) Applicant: Sony Interactive Entertainment America LLC, San Mateo, CA (US)

(72) Inventor: David Perry, Newport Beach, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 127 days.

(21) Appl. No.: 14/788,353

(22) Filed: Jun. 30, 2015

(65) Prior Publication Data
US 2016/0361646 A1 Dec. 15, 2016

Related U.S. Application Data

(60) Provisional application No. 62/175,995, filed on Jun. 15, 2015.

(51) Int. Cl.
A63F 9/24 (2006.01)
A63F 13/00 (2014.01)
(Continued)

(52) U.S. Cl.
CPC .......... A63F 13/355 (2014.09); A63F 13/215 (2014.09); A63F 13/497 (2014.09); A63F 13/795 (2014.09); A63F 13/86 (2014.09); A63F 13/87 (2014.09); G06F 3/048 (2013.01); H04N 21/25875 (2013.01); H04N 21/2668 (2013.01); H04N 21/2743 (2013.01); H04N 21/475 (2013.01); H04N 21/4781 (2013.01); H04N 21/4788 (2013.01)

(58) Field of Classification Search
USPC .............................. 463/20, 22, 25, 31, 39, 42
See application file for complete search history.

(56) References Cited

U.S. PATENT DOCUMENTS

2003/0220143 A1* 11/2003 Shteyn .................... A63F 13/12
463/42
2005/0112536 A1* 5/2005 Frayman ................ G09B 19/00
434/247
(Continued)

OTHER PUBLICATIONS

Anonymous: "Twitch.tv—Wikipedia, the free encyclopdia", Jun. 13, 2015, XP055289759, Retrieved from the internet: URL:https://en.wikipedia.org/w/index.php?title=Twitch.tv&oldid=666766981[retrieved on Jul. 19, 2016].
(Continued)

Primary Examiner — Adetokunbo O Torimiro
(74) Attorney, Agent, or Firm — Martine Penilla Group, LLP

(57) ABSTRACT

A system and method for saving at least a portion of a game with the comments that were made by one or more spectators to the user's live gaming session. The saved portion of the gaming session can be played back at a later time. One or more play back viewer's comments can be associated to the recorded gaming session. The associated play back viewer's comments can be associated corresponding in time with a timing reference within the game. The play back viewer's comments can include the play back viewer's identification. All of the comments to the user's game play can be filtered and shared according to a friend list or other sharing protocol.

14 Claims, 11 Drawing Sheets

(51) Int. Cl.
*G06F 17/00* (2006.01)
*G06F 19/00* (2018.01)
*A63F 13/355* (2014.01)
*A63F 13/215* (2014.01)
*A63F 13/86* (2014.01)
*G06F 3/048* (2013.01)
*H04N 21/258* (2011.01)
*H04N 21/2668* (2011.01)
*H04N 21/2743* (2011.01)
*H04N 21/475* (2011.01)
*H04N 21/478* (2011.01)
*H04N 21/4788* (2011.01)
*A63F 13/795* (2014.01)
*A63F 13/497* (2014.01)
*A63F 13/87* (2014.01)

(56) References Cited

U.S. PATENT DOCUMENTS

| 2011/0111854 | A1* | 5/2011 | Roberts | H04N 7/17318 |
| | | | | 463/39 |
| 2013/0260896 | A1 | 10/2013 | Miura et al. | |
| 2014/0089801 | A1* | 3/2014 | Agrawal | G06F 3/0484 |
| | | | | 715/719 |

OTHER PUBLICATIONS

Intl Search Report PCT/US2016/032674, dated Jul. 26, 2016, 4 pages.

\* cited by examiner

CAPTURING ASYNCHRONOUS COMMENTARY TO PRE-RECORDED GAMEPLAY

CROSS REFERENCE TO RELATED APPLICATIONS

This application claims priority from U.S. Provisional Patent Application No. 62/175,995 filed on Jun. 15, 2015 and entitled "Capturing Asynchronous Commentary to Pre-recorded Gameplay," which is incorporated herein by reference in its entirety.

FIELD OF DISCLOSURE

The present invention relates generally to cloud gaming environments, and more particularly, to systems and methods for adding comments to a previously saved game.

BACKGROUND

Cloud gaming is facilitated by a system of networked servers that are accessible to users via the Internet. The servers host multiple users' gaming sessions. Typically, a user is assigned a virtual server or a physical server for hosting the user's game play. Many games are complex and may last indefinite periods of time. Often a user will wish to share the viewing of his game play with one or more spectators. The spectators can add text and audio comments to the user's game play. For example, cheering, jeering or congratulating the user's performance at a particular point in the user's game play.

Often a user will wish to save this recorded game play for various reasons. By way of example, he may wish to share the recorded game play with one or more other users. The user may share the game play to brag or otherwise show-off a particular performance of a particular portion of the game play to one or more friends. Similarly, the user may use the saved game play as a challenge to other players or as a best of or worst of (e.g., bloopers) type of list.

It is in this context that embodiments of the invention arise

SUMMARY

Broadly speaking, the present invention fills these needs by providing a system and method for saving at least a portion of a game with the comments that were made by one or more spectators to the user's actual live gaming session. The saved portion of the game can be played back at a later time. One or more play back viewer's comments can be added to the recorded game. The added play back viewer's comments can be saved corresponding in time with game. The play back viewer's comments can include the play back viewer's identification. All of the comments to the user's gaming session can be sorted and displayed according to a friend list or other sharing protocol.

In one embodiment, provides a method of asynchronous commenting on a gaming session. A gaming session that is executed by a cloud gaming system is recorded. The recorded gaming session producing a game play clip that includes a video recording of a gaming session and an audio recording of a player participating in the gaming session and a spectator observing the player participating in the gaming session. The game play clip includes a portion of the recorded gaming session and a portion of the audio recording that corresponds to the game play clip. The game play clip also includes one or more highlight events of play occurring within the gaming session. Sharing of the game play clip to a website in enabled to enable viewing by users of the website. Playback of the game play clip is provided in response to selection of the game play clip by a playback viewing user of the website. The playback including the portion of the recorded game session and the portion of the audio recording, the portion of the audio recording having one or more comments that relate to the highlight events that occurred during the gaming session. The one or more comments are output with the audio recording during the playback of the game play clip. The comments are identified as being provided by the player participating in the gaming session or the spectator observing the player.

Playback of the game play clip can also include determining if the playback viewing user of the website is a friend of the spectator and including in the portion of the audio recording audio corresponding to the spectator when it is determined that the spectator is a friend of the playback viewing user. Being a friend can be determined from a social graph of relationships managed by the website or obtained from a social networking site. Alternatively, the portion of the audio recording audio corresponding to the spectator can be excluded when it is determined that the spectator is not a friend of the playback viewing user.

Audio recording of a viewing user accessing the shared game play clip can be received during playback of the game play clip and a portion of the audio recording of the playback viewing user can be associated with specific highlights in and/or other comments to the game play clip. The views of the comments of the spectator can be filtered based on whether a friend relationship is present between the playback viewing user and the spectator, the friend relationship being determined by a social graph managed by the website or obtained from a social networking site.

The audio recording of the at least one player can include a corresponding player text identification data identifying the one player and a player text comments file of verbal and written comments made by the player. The audio recording of the spectator can include a spectator text identification data identifying the spectator and a spectator text file of verbal and written comments made by the spectator. A playback request to replay the recorded gaming session can be received by the server. The playback request can be received from a client device corresponding to a second spectator. The recorded gaming session can be replayed in response to the request to replay the recorded gaming session. The replayed recorded gaming session can be recorded as a first updated recorded gaming session including an association of an audio recording of the second spectator as the second spectator observed the replayed gaming session. The audio recording of the second spectator can also include a second spectator text identification data identifying the second spectator and a second spectator text file of verbal and written comments made by the second spectator. The audio recording of the second spectator observing the replayed gaming session can be aligned in time with corresponding action occurring in the replayed gaming session.

The player text file of verbal comments made by the player can include a corresponding player voice recognition identifying the verbal comments of the player and a player voice recognition output of the verbal comments made by the player.

Another embodiment provides a cloud gaming system for associating asynchronous comments to a gaming session hosted on the cloud gaming system. The cloud gaming system includes a server for hosting a cloud gaming session. The server being coupled to a player's client device via a network. The server being configured to receive control inputs from the player's client device and to execute the cloud gaming session according to the received control inputs. The server being coupled to a spectator's client device via the network and being configured to stream video of the executed the cloud gaming session to the player's client device and the spectator's client device. A game recorder logic is included in the server. The game recorder logic is configured to record a game play clip including a video recording of the streamed video of the gaming session, an audio recording of the player participating in the gaming session, and an audio recording of a spectator observing the player participating in the gaming session. The game recorder logic is configured to associate the audio recording of the player and the audio recording of the spectator with the streamed video of the executed the cloud gaming session. The server can share the game play clip to a website according to the control inputs received from the player's client device. A video playback logic can stream a playback of the game play clip in response to selection of the game play clip by a playback viewing user of the website. The playback including the portion of the recorded game session and the portion of the audio recording. The included portion of the audio recording having one or more comments that relate to the highlight events that occurred during the gaming session. The playback of the game play clip including one or more comments to be output with the audio recording during the playback of the game play clip, wherein the comments are identified as provided by the player participating in the gaming session or the spectator observing the player.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings.

DETAILED DESCRIPTION

Figure 1A:
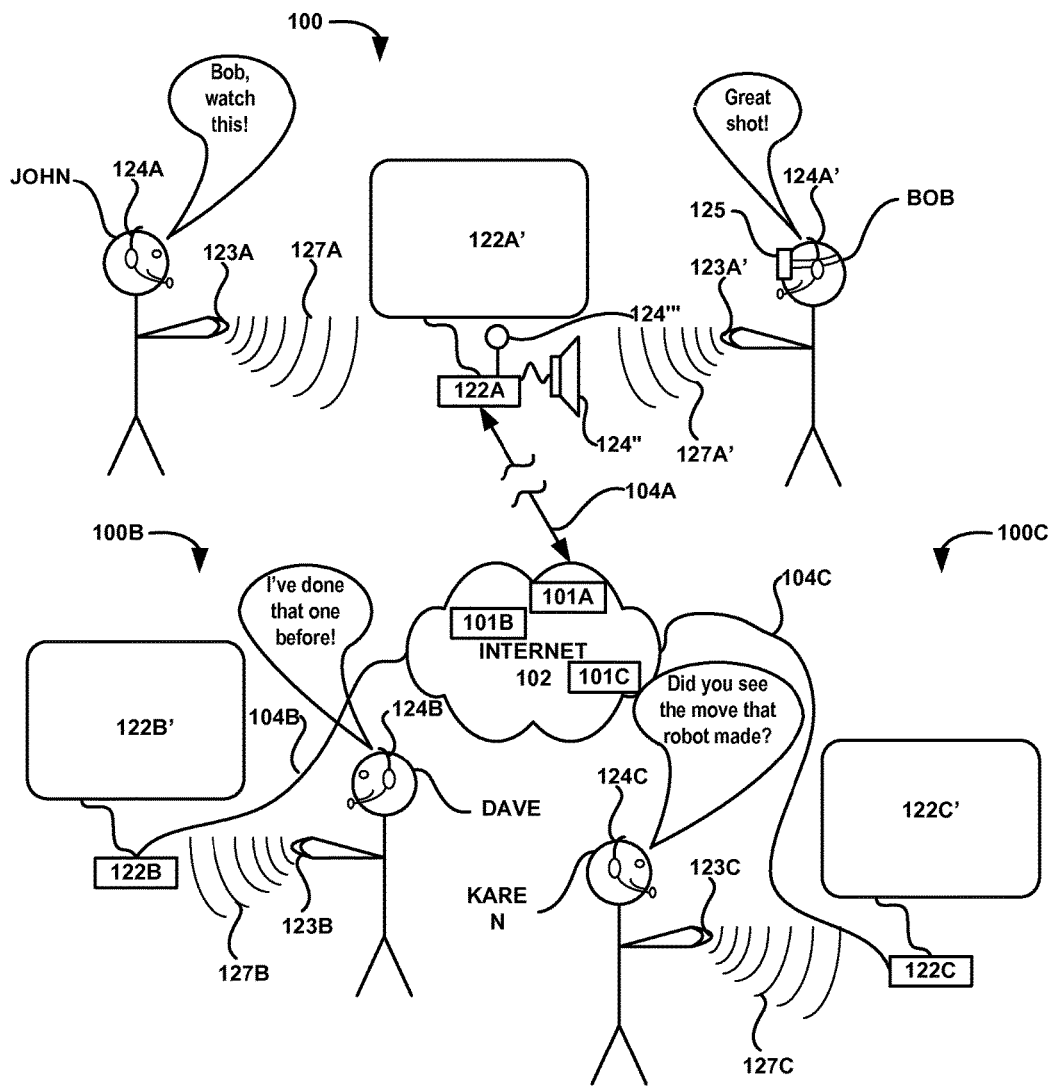
FIG. 1A is a simplified gaming system, for implementing embodiments of the present disclosure.

Several exemplary embodiments for systems and methods for asynchronous saving one or more play back viewer's comments to a previously recorded gaming session will now be described. It will be apparent to those skilled in the art that the present invention may be practiced without some or all of the specific details set forth herein.

Cloud gaming is becoming very popular gaming environment. Cloud gaming allows single player and multi-player gaming session and also allows a user to play complex, content-rich games such as games with rich interactive content as well as immersive three-dimensional (3D) graphics. Such content rich games require complex and powerful, often very specialized computers having specialized processors, co-processors and graphics processors. Cloud gaming also requires well engineered server processes to reduce latency and monitor latency to avoid performance drops. As an added benefit, cloud gaming allows a user to play content rich games on a much simpler, client computer. As an example, a user can play games on a cloud gaming system using a tablet, a smartphone, a head mounted display (HMD) or other handheld computing device capable of communicating with the cloud gaming system via a local network and/or the Internet.

The described cloud gaming system allows a first user to save at least a portion of a gaming session (i.e., a game clip) with the associated comments that were made by one or more spectators to first user's actual live gaming session. The saved game clip can be as long as the entire gaming session or as short as only a few seconds. The game clip can include a selected highlight of the gaming session that the first user selected to record and share. The comments can include written or verbalized comments made by the first user and the spectators. The comments can be saved in separate data files and associated in time with the game play.

Each of the comments can also be associated with the user or spectator that made the comments.

The saved portion of the gaming session can be played back at a later time with the associated comments made by the first user and the spectators to first user's live gaming session. The saved portion of the gaming session can be played back by one or more play back viewers. The play back viewers can also add written and verbalized comments to the recorded gaming session. The recorded gaming session can be updated to include the associated play back viewer's comments made during the play back of the gaming session. The added play back viewer's comments can be associated corresponding in time with gaming session. A second play back viewer can view the play back including the comments made by the first user and the spectators to first user's live gaming session and any previously added play back viewer's comments.

The play back viewer's comments can include the play back viewer's identification. All of the comments to the first user's gaming session can be filtered according to a friend list or other sharing protocol. By way of example, the first user's live gaming session is observed live by Friend 1, Friend 2 and Friend 3 and each of the observing friends submitted comments during the first user's live gaming session. All of Friends 1, 2 and 3 are friends of the first user. However, Friend 2 and Friend 3 are not friends to each other but are both friends of Friend 1 and the first user. The comments submitted by the first user, Friend 1, Friend 2 and Friend 3 during the live gaming session will all be saved and associated with the gaming session when the first user saves the gaming session.

In another implementation, the comments associated with the first user's saved playing session can be filtered by a friend score relative to the first user. For example, the first play back viewer may have 32 friends in common with the first user and the second playback viewer may only have 12 friends in common with the first user. As a result, first play back viewer would have a higher friend score relative to the first user than the second playback viewer. The first play back viewer's comments may not be shared with the second playback viewer such that the first play back viewer's comments may not be visible by or audible to the second playback viewer when the second playback viewer is viewing the first user's saved gaming session. It should be understood that this is a simplified friend scoring example as friend scores can include degree of friendship such as if 43 friends of the second play back viewer are not friends of the first user but are friends with 64 of the friends of the first user would yield a higher friend score than the first playback viewer's friend score, relative to the first user.

During the live gaming session and during any play back of the saved game, comments made by Friend 3 may not be visible or audible to Friend 2 and comments made by Friend 2 may not be visible or audible to Friend 3 because Friend 2 and Friend 3 are not friends to each other. During the live gaming session and during any play back of the saved game, comments made by Friend 3 and Friend 2 will be visible by or audible to the first user and Friend 1. Similarly, comments made by the first user and Friend 1 are visible by or audible to Friend 2 and Friend 3.

Friend 4 is a friend of only the first user and Friend 3. Friend 4 selects the first user's saved game for play back. Friend 4 will be able to see and hear comments from the first user and Friend 3 but not those from Friend 1 or Friend 2. If Friend 4 adds a comment during the play back and Friend 2 then later selects the first user's saved game for play back, Friend 2 will not see or hear Friend 4's comments.

The disclosed cloud gaming asynchronous associating one or more play back viewer's comments to a previously recorded gaming session technology has other uses as well. For example the first user's gaming session could be shared among other users to allow other users to experience the same gaming session or possibly to help the first user (who may be at another remote location, but connected the cloud gaming service). As an example, the first user can post the saved game play, or a link to the saved gaming session, to a social network. In one implementation, the first user can select a share button or option on a controller or other user interface to share the saved game.

FIG. 1A is a simplified gaming system 100, for implementing embodiments of the present disclosure. The basic, local gaming system 100 includes a client device 122A, coupled to a display 122A' and one or more game controllers 123A, 123A'. The game controllers 123A, 123A' are coupled to the client device 122A via a wired or wireless (shown) communication link 124A-n. The basic, local gaming system 100 can also include one or more headsets and microphones 124A, 124A' and/or a speaker 124" and an area microphone 124A''' and or an HMD 125.

Multiple users: John, Bob, Dave, Karen, Henry and Joe are discussed through the following example embodiments. As shown in FIG. 1A, a user, John is using his game controller 123A, headset and microphone 124A to play a game via the client device 122A. John's friend Bob is using his client device 123A', headset and microphone 124A' to observe as John plays the game via the client device 122A. Bob may also use an optional HMD 125 to observe and interact with John's game play. The HMD can provide viewing capability to Bob instead of or in addition to the display 122A'. John and Bob are using their controllers 123A, 123A', and headsets and microphones 124A, 124A' to add spoken (audible) comments and text comments to the game as John plays the game.

The basic game system 100 is coupled to one or more servers 101A-C on the Internet 102 via wired or wireless network 104A so that John can share his gaming session with his friends Dave and Karen. Dave and Karen have their own, basic gaming systems 100B, C, respectively, coupled to one or more servers 101A-C on the Internet 102 via wired or wireless networks 104B, 104C, respectively. Dave and Karen can observe as John plays the game using their respective client devices 122B, C. Dave and Karen can add verbal and text comments as John plays the game, using their respective game controllers 123B, 123C and headsets and microphones 124B, 124C.

John has selected that the gaming session will be recorded so he and his friends can watch it again at some time in the future. John's recorded gaming session can be stored on his own client device 122A for later playback at his own home. Alternatively, John can store the recorded gaming session on one or more servers 101A-C of a cloud gaming system on the Internet 102 so that John can share the recorded gaming session with anyone with a connection to the Internet 102.

Figure 1B:
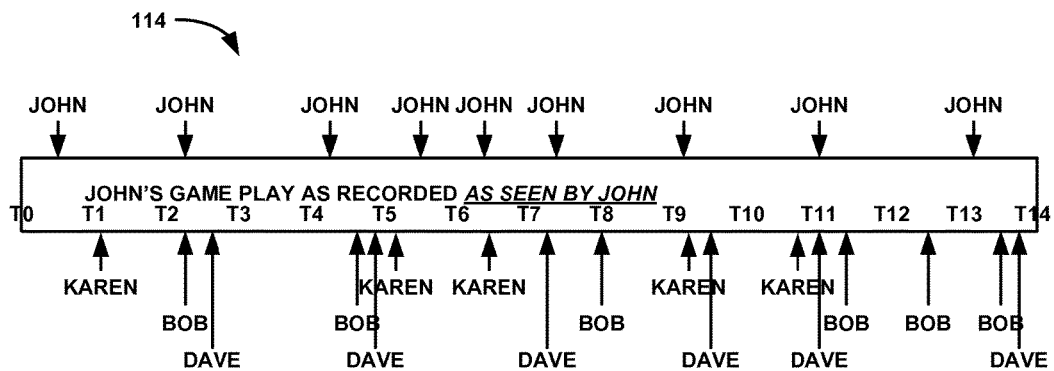
FIG. 1B is a timeline of John's recorded gaming session as seen by John and Dave, for implementing embodiments of the present disclosure.

FIG. 1B is a timeline of John's recorded gaming session 114 as seen by John and Dave, for implementing embodiments of the present disclosure. Timeline points T0-T14 correspond to points of time within the game play. By way of example T0 may be the beginning of a game play clip corresponding to a time point of 2 minutes and 11 seconds into a level 22 of a game played by John. Similarly, timeline point T1 could correspond to a time point of 20 seconds after timeline point T0 such as at game play time at 2 minutes and 31 seconds into the level 22 of the game played by John.

Even though the relative distances between each of the pairs of timeline points are shown as being substantially equal, it should be understood that the corresponding time interval between each pair of the timeline points T0 to T14 may be different. By way of example, the time interval between timeline points T0 and T1 may be 20 seconds, while the time interval between timeline points T1 and T2 may be only 4 seconds and the time interval between timeline points T4 and T5 may be 42 seconds and so forth along the timeline points.

Each of Dave, Bob and Karen are John's friends and each of John, Bob and Karen are Dave's friends. As a result of their friends status, John and Dave can see and hear each of Bob and Karen's comments that occurred during John's gaming session. John's comments are represented by the arrows pointing down to the timeline and labeled as coming from John. Each of Dave's, Bob's and Karen's comments are represented by the arrows pointing upward from their respective names, to the timeline and labeled as coming from each of them, respectively.

John can also see and hear comments made by Dave, Bob and Karen during his gaming session, or a clip of the gaming session, if John were to play back the previously recorded gaming session. Similarly, Dave can also see and hear comments made by John, Bob and Karen during his gaming session if Dave were to play back the previously recorded gaming session.

Figure 1C:
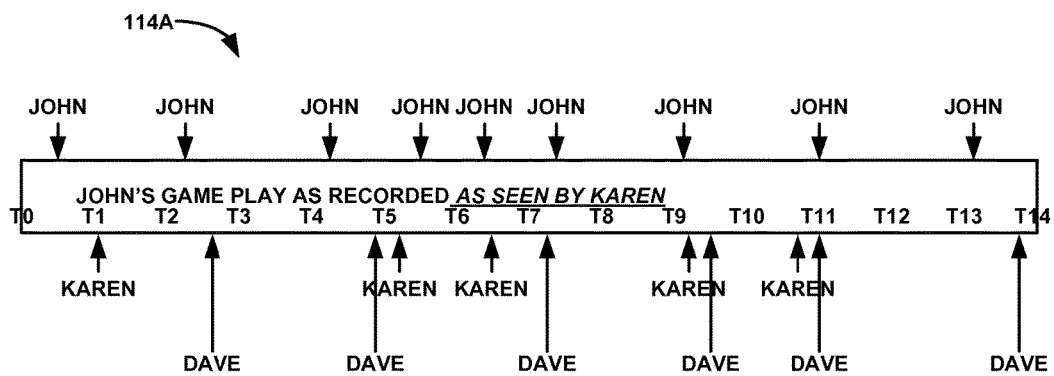
FIG. 1C is a timeline of John's recorded gaming session as seen by Karen, for implementing embodiments of the present disclosure.

FIG. 1C is a timeline of John's recorded gaming session 114A as seen by Karen, for implementing embodiments of the present disclosure. Karen is friends with John, and Dave but not Bob and therefore Karen can see and hear John and Dave's comments made during the gaming session and during any play back of a previously recorded gaming session. During the recording of John's gaming session, Karen may not see or hear Bob's comments.

Figure 1D:
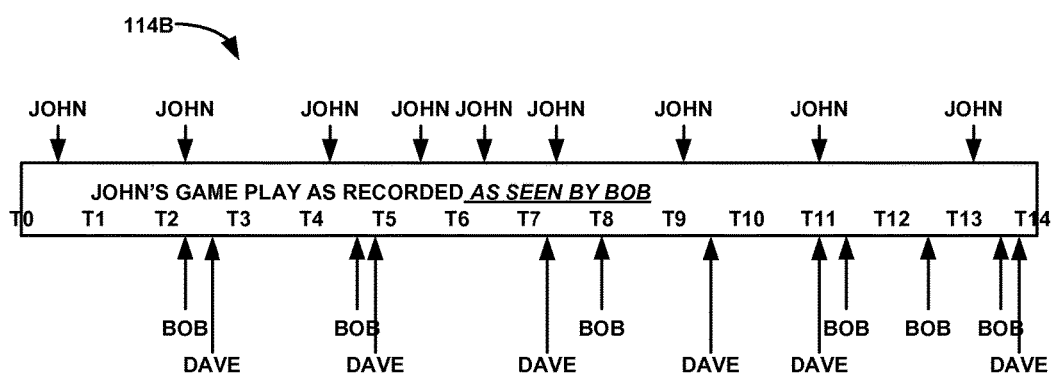
FIG. 1D is a timeline of John's recorded gaming session as seen by Bob, for implementing embodiments of the present disclosure.

FIG. 1D is a timeline of John's recorded gaming session 114B as seen by Bob, for implementing embodiments of the present disclosure. Bob is friends with John, and Dave but not Karen and therefore Bob can see and hear John and Dave's comments made during the gaming session and play back of a previously recorded gaming session. During the recording of John's gaming session, Bob may not see or hear Karen's comments.

Bob may have enabled an option to allow non-friends to see and hear his comments and, in that instance, Karen could see and hear Bob's comments. Similarly, Bob would not see or hear Karen's comments unless Karen had enabled the option to allow non-friends to see and hear her comments.

Figure 1E:
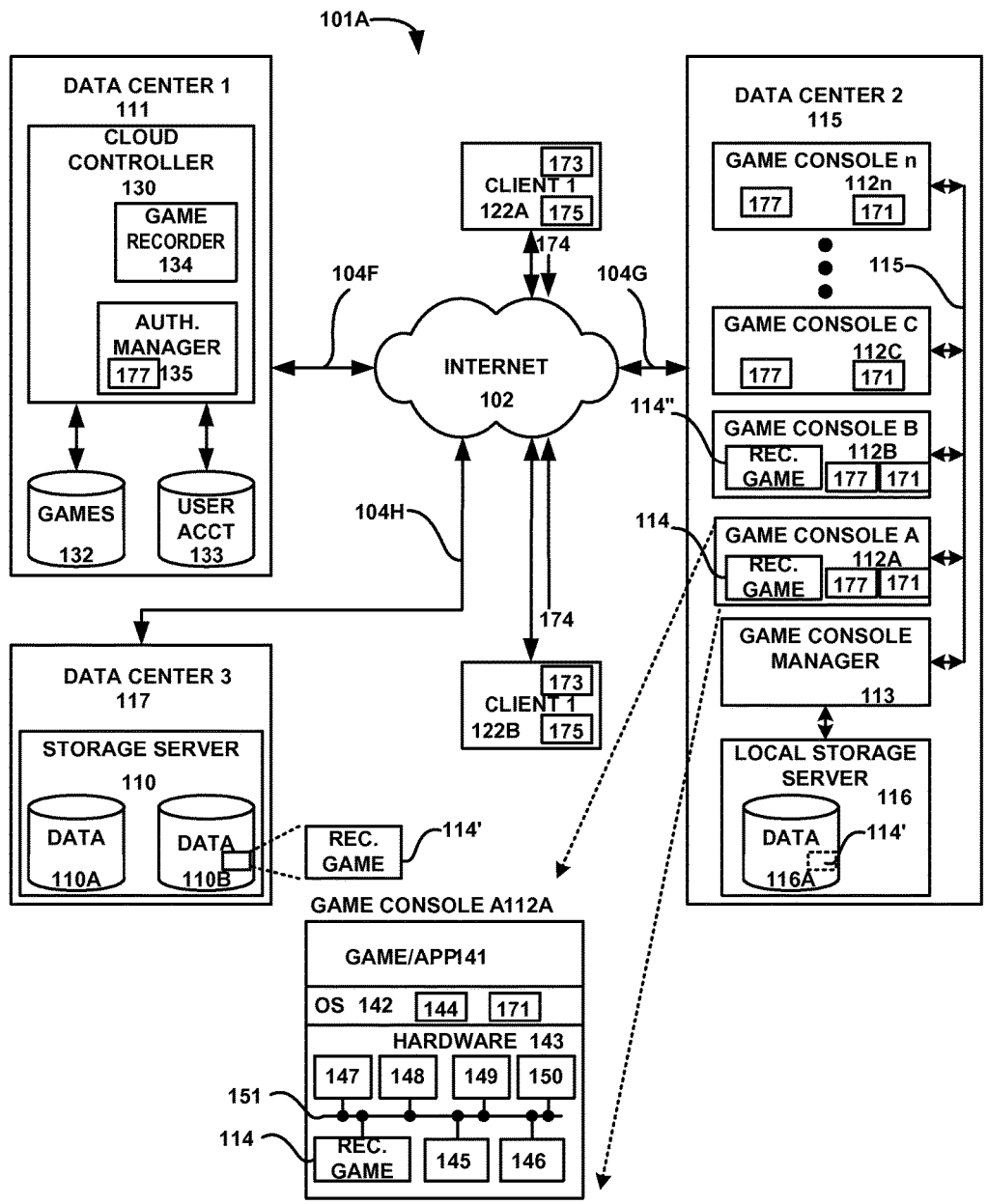
FIG. 1E is a simplified cloud gaming system that may be implemented in one or more servers, for implementing embodiments of the present disclosure.

FIG. 1E is a simplified cloud gaming system that may be implemented in one or more servers 101A-C, for implementing embodiments of the present disclosure. The cloud gaming system includes a cloud controller 130, multiple servers/game consoles 112A-n, one or more game console managers 113 and a storage server 110. The cloud controller 130, the multiple servers/game consoles 112A-n, the one or more game console managers 113 and the storage server 110 can be located in one or more data centers 111, 115, 117. The cloud controller 130, the multiple servers/game consoles 112A-n and the storage server 110 are coupled together by local area networks 104E-G and/or the Internet 102. The multiple servers/game consoles 112A-n and the game console manager 113 can be co-located in a single data center 115 or distributed among multiple data centers.

One or more game console managers 113 can be included in each rack of servers/game consoles 112A-n. The game console managers 113 manage one or more servers/game consoles 112A-n depending on one or more hardware and/or software architectures. The game console managers 113 are physically connected to the servers/game consoles 112A-n using a network connection 115 and/or an optional general purpose input/output, a universal serial bus or an equivalent control connection for activating power to a game console. The game console manager 113 can optionally include additional roles such as setting up and managing a streaming session between the assigned server/game console and the user's client device 122A-n.

A local storage server 116 could optionally be co-located in the same data center 115 with one or more of the multiple servers/game consoles 112A-n. The local storage server 116 can store data 116A to be used by or received from the multiple servers/game consoles 112A-n and/or the cloud controller 130. The data centers 111, 115, 117 can be separated geographically. By way of example, the first data center 111 and the third data center 117 can be located in Los Angeles, Calif. and the second data center 115 can be located in Stockholm, Sweden.

The cloud controller 130 and/or the game console manager 113 includes a games database 132 for storing multiple games and other applications that may be downloaded to or made available on one of more of the multiple servers/game consoles 112A-n. The cloud controller 130 also includes an authorization manager 135. The authorization manager 135 determines if a first user has a valid account and the authorized access to the cloud gaming system 100. The first user's account information is included in a user account database 133. In one or more implementations, the cloud controller 130 can also include a game recorder 134. The game recorder 134 can also work with a game recorder logic 144 included in each of the servers/game consoles 112A-n to capture a selected gaming session, or game clip, occurring on the respective server/game console.

The storage server 110 provides storage facilities for the cloud gaming system 100. The storage server 110 includes one or more storage devices 110A, 110B for storing data such as a user's recorded gaming session 114' and the associated comment data files, as may be required by the cloud gaming system 100. The one or more storage devices 110A, 110B can be any suitable storage media, e.g., hard disk drive, solid state drive, or optical drive, etc.

Each of the game consoles 112A-n includes a hardware layer 143 and an operating system layer 142 overlying the hardware layer. An application layer 141 overlays the operating system layer 142. The application layer 141 includes games and other applications that are run on the server/game console 112A. The hardware layer includes a main processor 145, a co-processor 146, a graphics processor (GPU) 147, a memory system 148, an input output system 149, a network interface card 150 and many other physical peripherals and virtual peripherals that may be required for the operations of the game console 112A. The main processor 145, the co-processor 146, the graphics processor 147, the memory system 148, the input output system 149, the network interface card 150 and other peripherals are coupled together by one or more data buses 151.

In at least one implementation, the operations system layer 142 includes a game recorder logic 144. In other implementations the game recorder logic 144 could be included in one or more applications in the application layer 141. The game recorder logic 144 could also be implemented having portions residing in both the operations system layer 142 and the application layer 141. The game recorder logic 144 can record the gaming session 114 of the server/game console 112A. The recorded gaming session 114 can alternatively or additionally be stored as recorded gaming session 114' in a local storage server 116 and/or in the storage server 110. The storage location of the stored recorded gaming session 114' can also be provided to the cloud controller to add to the first user's account information in the user account database 133.

In at least one implementation, the operations system layer 142 also includes video playback logic 171. In other implementations the video playback logic 171 could be included in one or more applications in the application layer 141. The video playback logic 171 could also be implemented having portions residing in both the operations system layer 142 and the application layer 141. The video playback logic 171 can stream video images of the gaming session 114 hosted on the server/game console 112A to the client devices 122A-n.

In at least one implementation, the cloud gaming system also includes sharing logic 177. The sharing logic 177 can be included in the cloud controller 130 such as part of the authorization manager 135 having the capabilities for sharing according to the user's preferences as may be set by the user in the user account information database 133. In other implementations the sharing logic 177 could be included in the server/game console 112A-n or the user's client device 122A-n. The sharing logic 177 can determine how to share the saved game clip when a sharing instruction is received by the server/game console 112A-n. The sharing can include determining a friend status or relationship between the user requesting the sharing, a spectator that viewed the gaming session that includes the saved game clip and a playback viewing user wishing to view the saved game clip.

The client devices 122A, 122B provide access to the cloud gaming system 100 via the Internet 102 or a local network 104A-E. The client devices 122A, 122B can provide control inputs 174 to the server/game console 112A and receive the streamed video images of the gaming session 114 from the video playback logic 171. The client devices 122A, 122B can display the streamed video images of the gaming session 114 on the respective display devices 122A' and 122B' as shown in FIG. 1A above. The client devices 122A, 122B can be any suitable platform capable of accessing the Internet 102 and/or a local network 104A-C. By way of example, the client devices 122A, 122B can be a game console, a personal computer, laptop computer, a notebook computer, a handheld gaming device, a handheld computing device such as a tablet computer or a smart telephone or any other suitable computing platform. The first client computing device 122A and the second client computing device 122B can be used in multiple different, geographically disparate locations. By way of example, the first client computing device 122A can be a tablet computer used to access the Internet 102 and the cloud gaming system 100 by the first user at his home, in his office and while he is travelling. Similarly, the second client computing device 122B can be a notebook computer capable of accessing the Internet 102 and the cloud gaming system 100 in a home, in an office or any other locations having access to the gaming system.

In one implementation, a first user, John, can use the first client computing device 122A to access the cloud controller 130 via the Internet 102. The authentication manager 135 authenticates the John's user identification and determines the access level allowed for John. The cloud controller 130 and/or the game console manager 113 assigns John to the game console A 112A for the present cloud gaming session and provides the authorized level of access including the authorized applications and games from the games and application database 132. The cloud controller 130 and/or the game console manager 113 may also transfer or otherwise activate the authorized games and other applications on the assigned server/game console 112A from the games and applications database 132. In one implementation, the assigned server/game console 112A can access the games and applications database 132 to transfer the authorized games and other applications to the assigned server/game console.

In one embodiment, the video playback logic 171 includes a low-latency video compression logic. The low-latency video compression logic may be implemented in software, hardware, or any combination thereof (certain embodiments of which are described below). The low-latency video compression logic includes logic for compressing audio information as well as visual information.

In operation, while playing a video game or using an application via the client device 122A-n via a keyboard, mouse, game controller 123A-n or other input device, control signal logic 173 on the client device 122A-n transmits control signals 174 (typically in the form of UDP packets) representing the button presses (and other types of user inputs) actuated by the user to the cloud gaming system. The control signals 174 from a client device 122A-n are routed to the appropriate server (or servers, if multiple servers are responsive to the user's client device) or game console 112A-n. As illustrated in FIG. 1E, control signals 174 may be routed to the server/game console 112A-n via the network 104 A-n. The server/game console executes the game or application software in response to the control signals 174. Although not illustrated in FIG. 1E, various networking components such as a firewall(s) and/or gateway(s) may process incoming and outgoing traffic at the edge of the cloud gaming system 120 (e.g., between the cloud gaming system 120 and the Internet 102) and/or between the Internet 410 and each of the client devices 112A-n.

The graphical and audio output of the executed game or application software i.e., new sequences of video images are provided to the video playback logic 171 and the low-latency video compression logic compresses the sequences of video images according to low-latency video compression techniques, such as those described in co-owned U.S. patent application Ser. No. 12/359,233 filed on Jan. 23, 2009 and entitled "System and Method for Compressing Video by Adjusting Tile Size Based on Detected Intraframe Motion or Scene Complexity," which is incorporated herein by reference in its entirety and for all purposes.

The sequence compressed video images, typically with compressed or uncompressed audio, are streamed to the client devices 112A-n over the Internet 102 and/or an optimized high speed network service that bypasses at least a portion of the publically accessible Internet. Low-latency video decompression logic, i.e., decoder 175 on each of the client devices 112A-n then decompresses the video and audio streams and renders the decompressed video stream, and typically displays the decompressed audio stream, on a display 122A'-n'. The decoder 175 can be implemented as software and or hardware on each of the client devices 112A-n. Alternatively, the audio can be played on speakers 124" and/or headsets 124A-n that may be separate from the display 122A'-n' or not at all. Note that, even though client devices 112A-n and displays 122A'-n' are shown as free-standing devices, they may be integrated within client devices such as portable computers or mobile devices.

Each one of the client devices 112A-n may be a very inexpensive and low-power device, with very limited computing or graphics performance and may well have very limited or no local mass storage. In contrast, each of the servers/game consoles 112A-n can be an exceptionally high performance computing system, and indeed, if multiple servers are used cooperatively in a parallel-processing configuration, there is almost no limit to the amount of computing and graphics processing power that can be brought to bear. The video playback logic 171 with the low-latency video compression logic and low-latency video decompression by the decoder 175, perceptually to the user, the computing power of the servers/game consoles 112A-n is being provided to the user. When the user presses a button on the game controllers 123A, 123A', the image on display 122A'-n' is updated in response to the button press perceptually with no meaningful delay, as if the game or application software were running locally on the user's client device 122A-n. Thus, with a client device 112A-n that is a very low performance computer or even an inexpensive chip that implements the low-latency video decompression decoder 175 and control signal logic 173, a user is provided with effectively arbitrary computing power from a remote location that appears to be available locally. This gives users the power to play the most advanced, processor-intensive (typically new) video games and the highest performance applications.

Figure 2A:
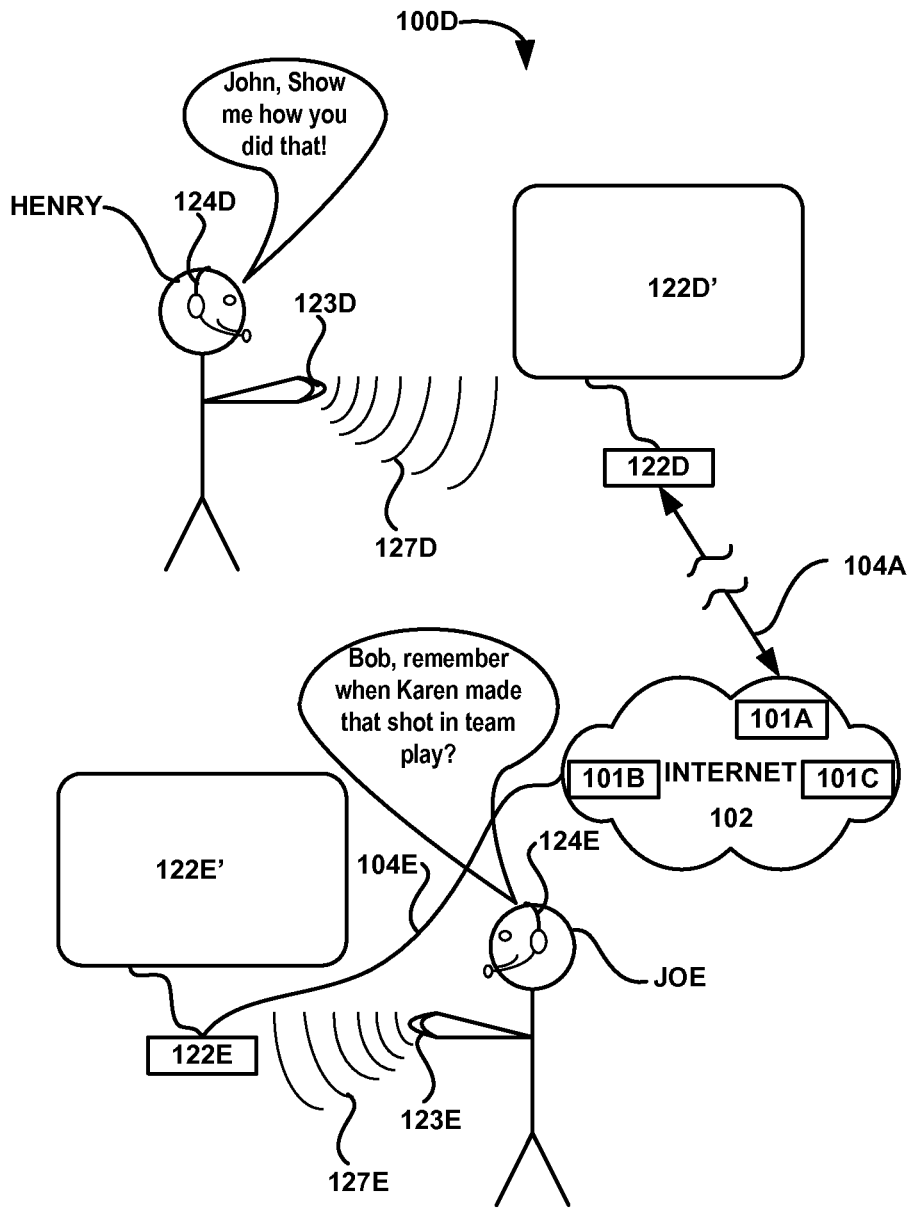
FIG. 2A is a schematic diagram of simplified gaming systems, for implementing embodiments of the present disclosure.

FIG. 2A is a schematic diagram of simplified gaming systems 100D, E, for implementing embodiments of the present disclosure. The gaming systems 100D, 100E are substantially similar to the gaming systems 100A-C described above as each gaming system includes a client device 122D, 122E, coupled to a display 122D', 122E' and one or more game controllers 123D, 122E. The game controllers 123D, 123E are coupled to the respective client devices 122D, 122E via a wired or wireless (shown) communication link 127D, 127E. The gaming systems 100D, E can also include one or more headsets and microphones 124D, 124E.

Henry and Joe are John's friends that John chose to share his previously recorded gaming session with. In another embodiment, John can share or post a link John's saved gaming session/clip on a website such as a social networking website so that his friends on the social networking site can access the saved gaming session. In another embodiment, John can post his saved gaming session or a link thereto, on a website that is open to public viewing and access. As shown in FIG. 2A, a user, Henry can use his client device 122D, game controller 123D, headset and microphone 124D to access and view a gaming session 114 that was previously recorded by John. Similarly, Joe can use his client device 122E, game controller 123E, headset and microphone 124E to access and view the game play session that was previously recorded by Joe 114 or Henry 114C.

Henry and Joe can use their client devices 122D, E, headset and microphone 124D, E to play back John's previously recorded gaming session via their client devices 122D, E. Similar to John, Bob, Karen and Dave, Henry and Joe are using their controllers 123D, E, and headsets and microphones 124D, E to make spoken (audible) comments and text comments to the play back of the previously recorded game. Joe and Henry can be viewing the play back of John's prerecorded gaming session at the same time or at different times.

The disclosed cloud gaming asynchronous saving one or more play back viewer's comments to a previously recorded gaming session technology is especially useful for cloud gaming purposes so that the users can share their previously recorded gaming session with their friends that have access to the cloud gaming system. Cloud gaming systems 100 are well suited to the disclosed cloud gaming asynchronous saving and/or associating one or more play back viewer's comments to a previously recorded gaming session technology, because cloud gaming systems include thousands of users connected all around the world.

Multiple implementations of the cloud gaming asynchronous saving one or more play back viewer's comments to a previously recorded gaming session technology and methods are disclosed herein. The following is a description of how asynchronous saving and sorted viewing of one or more play back viewer's comments can work.

Figure 2B:
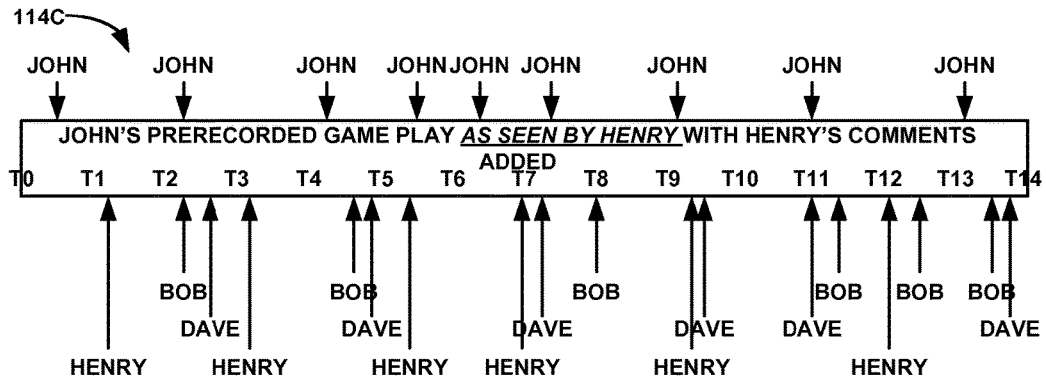
FIG. 2B is a timeline of John's recorded gaming session as seen by Henry, for implementing embodiments of the present disclosure.

FIG. 2B is a timeline of John's recorded gaming session 114C as seen by Henry, for implementing embodiments of the present disclosure. Each of John, Dave and Bob are Henry's friends. As a result of their respective friends status or friend score, Henry can see and hear each of John, Bob and Dave's comments made during the previous recording of John's gaming session.

Henry can make his written and verbal comments (represented as arrows extending from Henry's name toward the timeline) to John's previously recorded gaming session 114C as Henry experiences the play back of John's recorded gaming session. Henry's written and verbal comments can be recorded and associated with the corresponding time locations in John's previously recorded gaming session 114C. John or any other friend of Henry's can play back John's prerecorded gaming session 114C along with Henry's associated written and verbal comments.

Figure 2C:
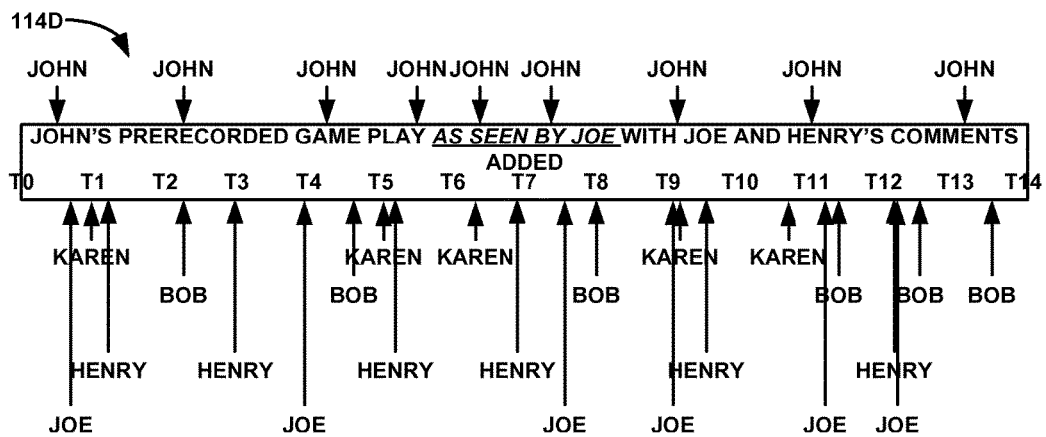
FIG. 2C is a timeline of John's recorded gaming session as seen by Joe, for implementing embodiments of the present disclosure.

FIG. 2C is a timeline of John's recorded gaming session 114B as seen by Joe, for implementing embodiments of the present disclosure. Each of John, Karen, Bob and Henry are Joe's friends. As a result of their friends status, Joe can see and hear each of John, Karen, Bob, Henry and Dave's comments made during the previous recordings of John's gaming session such as the live recording 114 of John's gaming session and the Henry's recording 114C of John's previously recorded gaming session.

Joe can add his written and verbal comments (represented as arrows extending from Joe's name toward the timeline) to John's previously recorded gaming session 114D as Joe experiences the play back of John's recorded gaming session. Joe's written and verbal comments can be recorded and associated in the corresponding time locations in John's previously recorded gaming session 114D. John or any other friend of Joe's can play back John's prerecorded gaming session 114D along with Joe's associated written and verbal comments.

Figure 2D:
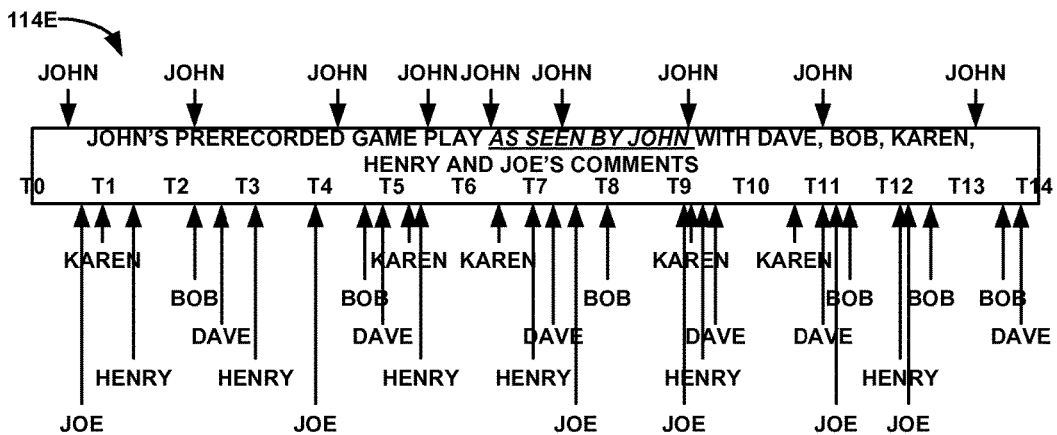
FIG. 2D is a timeline of John's recorded gaming session as seen by John after Joe and Henry's comments have been associated, for implementing embodiments of the present disclosure.

FIG. 2D is a timeline of John's recorded gaming session 114E as seen by John after Joe and Henry's comments have been associated, for implementing embodiments of the present disclosure. As all of Bob, Dave, Karen, Joe and Henry are friends with John, John can see and hear Bob, Dave, Karen, Joe and Henry's comments made during the gaming session and play back of a previously recorded gaming session.

Figure 2E:
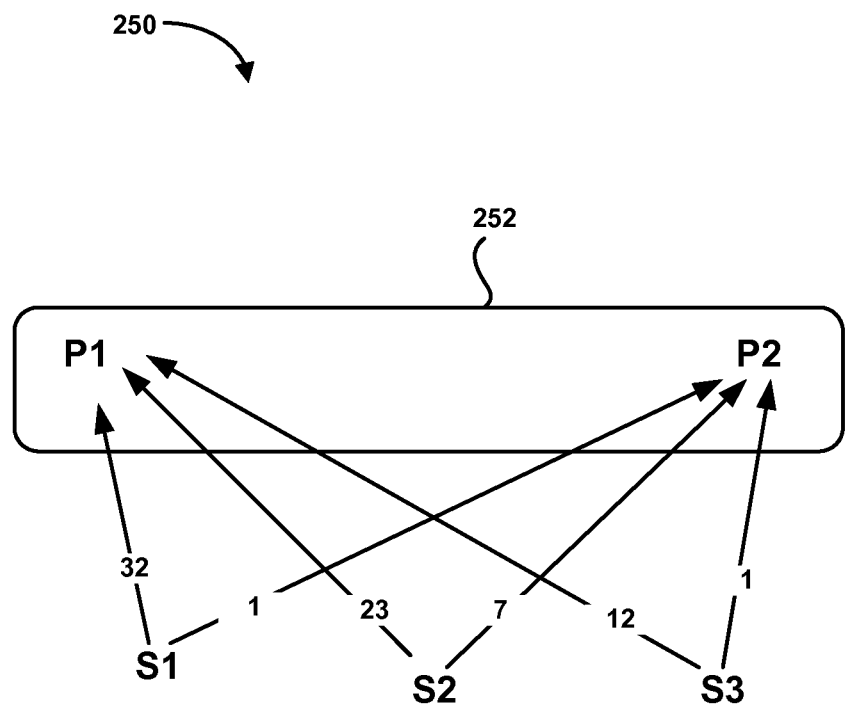
FIG. 2E is a simplified social graph showing friend connection scores in a social network between players P1 and P2 and spectators S1, S2 and S3, for implementing embodiments of the present disclosure.

In the foregoing discussion the status of being friends between each of the John, as the player, and spectators Bob, Dave, Karen, Joe and Henry and the friend status among the spectators as inputs to determine the filtering of the respective comments. It should be understood that the above defined "friends status" is simplified. Another useful approach is to filter the comments based on a friend connection score. FIG. 2E is a simplified social graph 250 showing friend connection scores in a social network between players P1 and P2 and spectators S1, S2 and S3, for implementing embodiments of the present disclosure. Players P1 and P2 are playing in a gaming session 252. Spectators 51, S2 and S3 are observing as players P1 and P2 are playing in the gaming session 252.

Spectator S1 has 32 friends in common with player P1 and only 1 friend in common with player P2. Thus giving spectator S1 a friend score of 33 for a gaming session 252 with players P1 and P2. Spectator S2 has 23 friends in common with player P1 and only 7 friends in common with player P2. Thus giving spectator S2 a friend score of 30 for the gaming session 252 with players P1 and P2. Spectator S3 has 12 friends in common with player P1 and only 1 friend in common with player P2. Thus giving spectator S3 a friend score of 13 for the gaming session 252 with players P1 and P2.

The respective friends' scores of spectators S1, S2 and S3 can then be used by the sharing logic 177 to filter whether or not the spectators S1, S2 and S3 can see each other's comments made during the gaming session or during any playback of a recorded gaming session. By way of example, player 1 may determine that he only wishes to share his gaming session with friends having a friends score of at least 15 with the gaming session. As a result, spectator 3, with a friends score of only 13 may not be able to see other comments made by spectators S1, S2. Similarly, player 2 may determine that he only wishes to share his gaming session with friends having a friends score of at least 10 with the gaming session. As a result, all of spectators S1, S2 and S3, with a friends score of at least 13 will be able to see other comments made by spectators S1, S2.

It should be understood the foregoing are very simple examples of using friend's scores to filter comments and that much simpler filtering. For example the filtering can be simplified so as to use only the friend score between the player and the spectator. Alternatively, the friend's scores can be used in a much more complex filtering such as including weighting factors of how often a selected spectator observes a selected one of the players in a gaming session or how often the selected spectator observes gaming sessions involving both players or how often the selected spectator views the same gaming sessions as another spectator and combinations all of the foregoing factors.

Figure 3A:
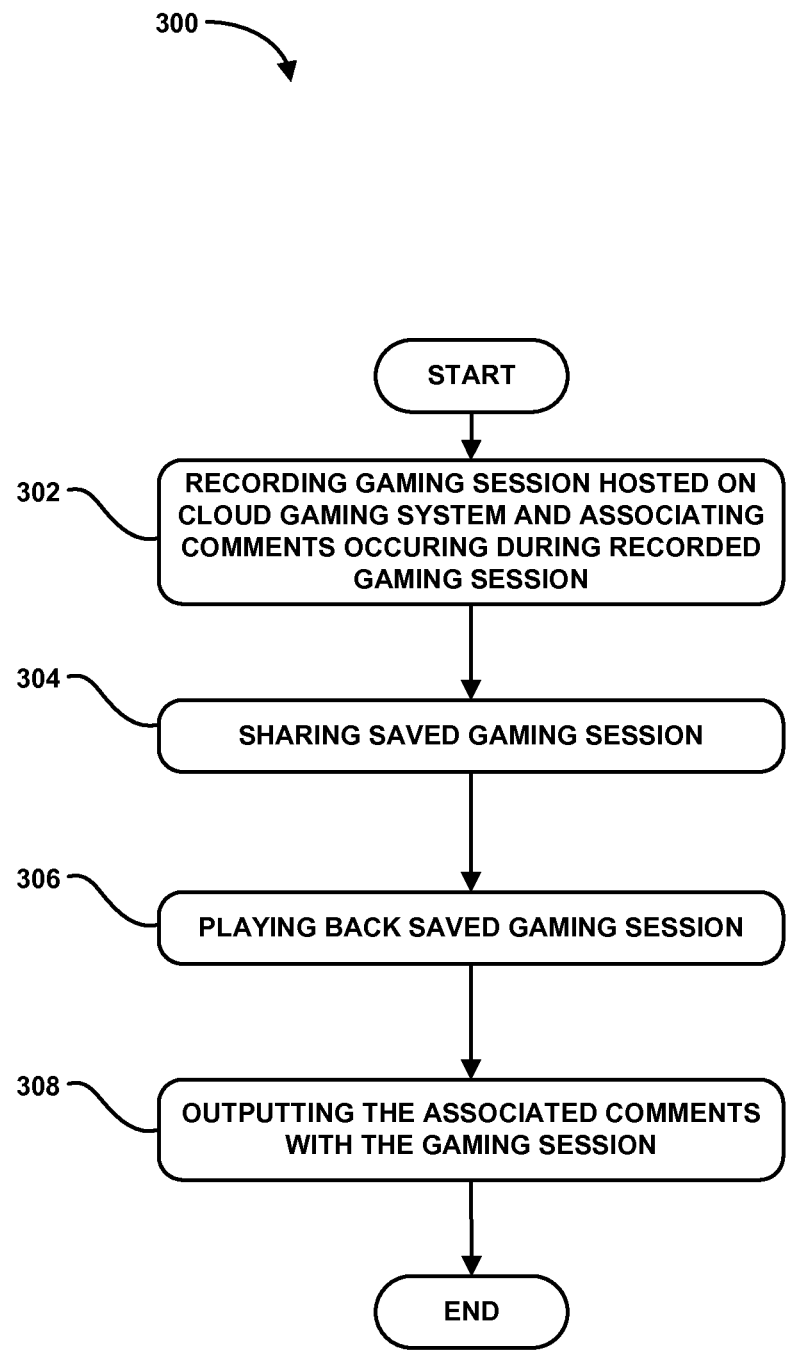
FIG. 3A is a flowchart diagram that illustrates a simplified overview of the method operations performed in the saving comments corresponding to a recorded gaming session, for implementing embodiments of the present disclosure.

FIG. 3A is a flowchart diagram that illustrates a simplified overview of the method operations 300 performed in the saving comments corresponding to a recorded gaming session, for implementing embodiments of the present disclosure. In an operation 302, a gaming session is recorded. As described above, the gaming session is executed by a cloud gaming system. Recording the gaming session produces a game play clip. The game play clip includes a video recording of the gaming session and an audio recording of a player participating in the gaming session and a spectator observing the player participating in the gaming session. The game play clip may including a portion of the recorded game session and a portion of the audio recording that corresponds to the portion of the recorded game session. The game play clip can include one or more highlight events of play occurring in the gaming session.

In an operation 304, sharing the game play clip to a website can be enabled to allow viewing by users of the website. In an operation 306, a playback of the game play clip can be provided in response to selection of the game play clip by a user of the website. The playback including the portion of the recorded gaming session and the corresponding portion of the audio recording. The corresponding portion of the audio recording can include one or more comments that relate to the highlight events that occurred during the gaming session.

In an operation 308, the one or more comments can be output with the corresponding portion of the audio recording during the playback of the game play clip. The comments are identified as provided by the player participating in the gaming session or the spectator observing the player and the method operations can end.

Figure 3B:
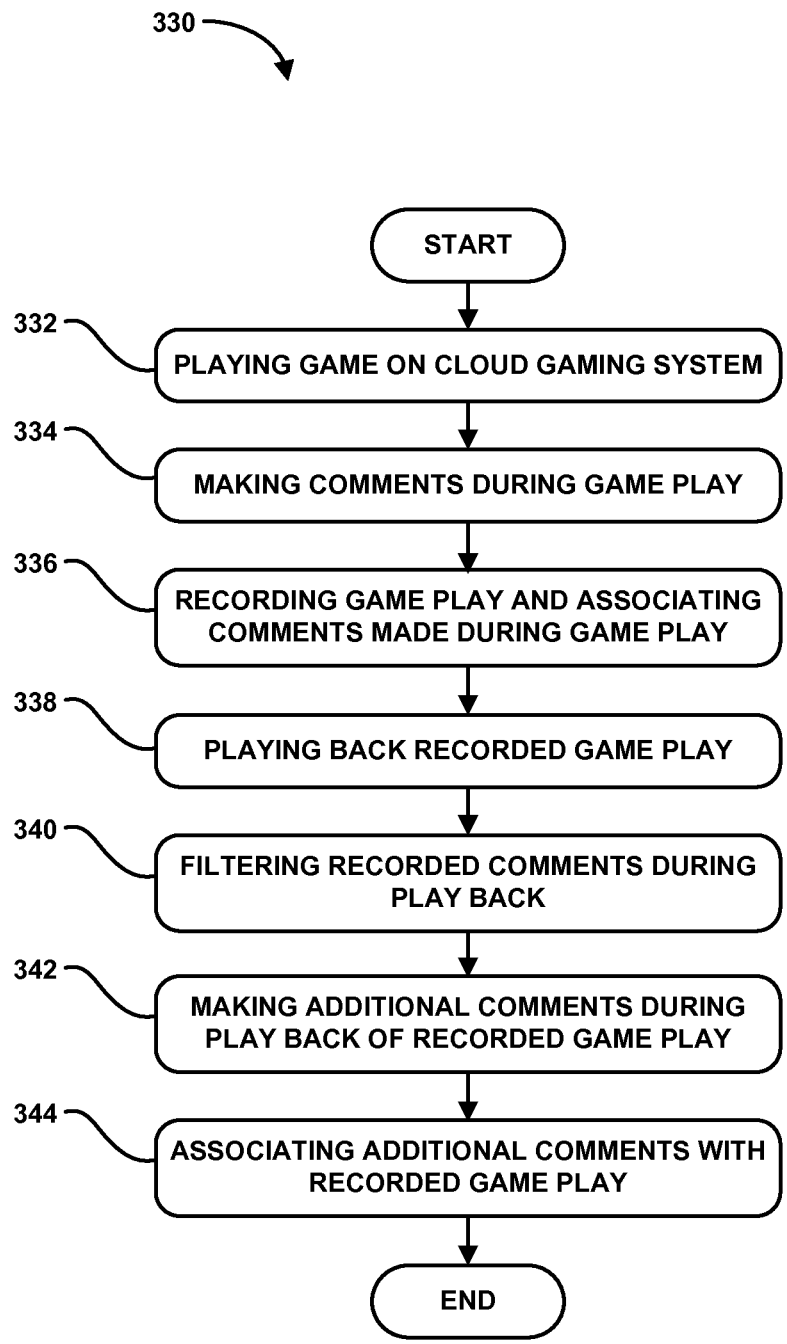
FIG. 3B is a flowchart diagram that illustrates a simplified overview of the method operations performed in the asynchronous saving one or more play back viewer's comments to a previously recorded gaming session, for implementing embodiments of the present disclosure.

FIG. 3B is a flowchart diagram that illustrates a simplified overview of the method operations 330 performed in the asynchronous saving one or more play back viewer's comments to a previously recorded gaming session, for implementing embodiments of the present disclosure. In an operation 332, a first user is playing a game on a game console 112A in a cloud gaming system 100. In an operation 334, the first user and one or more spectators observing the user's live gaming session can make comments regarding the game at a selected point in time during the gaming session as described in FIGS. 1A-D above.

The first user's gaming session is recorded in an operation 336. The recorded gaming session or a portion of the gaming session such as a game play clip of the gaming session can include association of the user and any spectator's comments made during the gaming session. The comments can include written and audible comments. The comments can also include corresponding user and/or spectator identification data corresponding to the user and or spectator originating the comments.

The user identification data can be derived from a voice recognition of the user or spectator as the source of the verbal comment. The comments can also include a text version of one or more of the verbal comments. The comments can also include date and time stamps and a game timing point within the game corresponding to the events in the gaming session that are occurring when the comments were made.

At some later time, in an operation 338, a user selects the first user's previously recorded gaming session for play back. The third user playing back the first user's previously recorded gaming session can be the first user or any other user authorized by the first user such as one or more of the first user's friends.

In an operation 340, the play back of the first user's previously recorded gaming session can be optionally filtered. The optional filtering can remove comments made by users and spectators that are not friends of the play back viewer, e.g., third user, such as described in FIGS. 2B and 2C, above. Alternatively, the filtering can include filtering comments by the real time the comments were posted and the comments corresponding to a particular time within the gaming session such as comments made between 2 and 4 minutes into the gaming session can be ignored or not played back as part of the play back. The comments can be filtered to not play back comments made by users that are not friends of the user requesting the play back. The comments can be filtered to play back public comments made by users that the commenting user designated were accessible to any user, e.g., accessible by the public. The foregoing are merely exemplary filtering or sorting possibilities for the meta data such as date, time, source, content, corresponding to the recorded comments.

In an operation 342, the play back viewer can make additional comments to the first user's previously recorded gaming session. As an example from FIG. 2B above, Henry in viewing John's prerecorded gaming session 114 and makes comments associated in time with play back of John's prerecorded gaming session.

In an operation 344, John's prerecorded gaming session 114 can be updated to include associations to recordings of Henry's comments. Henry's comments are recorded and associated in time with the play back of John's prerecorded gaming session and the method operations can end.

Figure 3C:
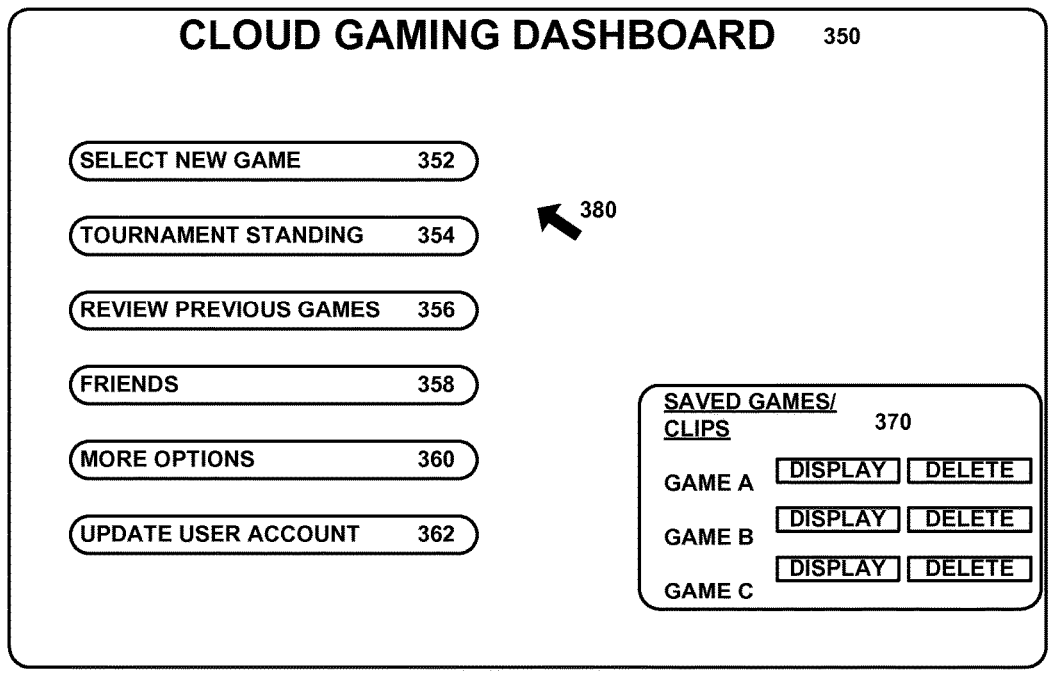
FIG. 3C is a simplified graphical user interface of a user's cloud gaming system dashboard, for implementing embodiments of the present disclosure.

FIG. 3C is a simplified graphical user interface of a user's cloud gaming system dashboard 350, for implementing embodiments of the present disclosure. The cloud gaming system dashboard 350 includes options to select a new game 352, research the user's current standing in a gaming tournament 354, review user's gaming history 356, update user's friends 358, other options 360 and update user account 362. Each of the options moves the user to a corresponding screen for performing the selected option.

The cloud gaming system dashboard 350 can also include a saved games menu 370. The saved game/clip menu 370 includes a list of saved games/clips and options to display or delete the saved games/clips. It should be noted that the user can have more than one saved games/clips and can save a game or clip of a game at any time and for any reason the user chooses. A pointer 380 for selecting the displayed menu options is also shown in the cloud gaming system dashboard 350 screen.

Figure 3D:
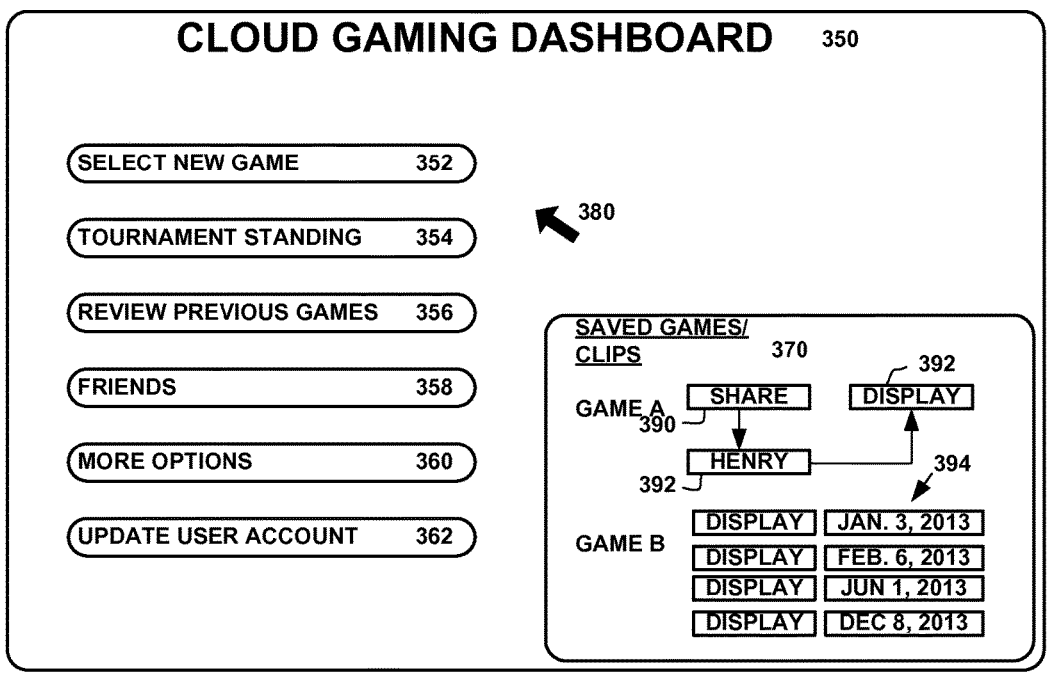
FIG. 3D illustrates an example where the user is provided the functionality to share a saved game A, for implementing embodiments of the present disclosure.

FIG. 3D illustrates an example where the user is provided the functionality to share 390 a saved game A, for implementing embodiments of the present disclosure. The system may also share the saved game with Henry 392, and is then provided with the ability to display or play back the saved game by Henry. It is also possible for Henry to add Henry's comments to the played back game.

Further shown in FIG. 3D is the option to save historical information 394 of saved games/clips of game B. If the user saves game B, or several clips of game B, several times, it is possible for the user to display or play back each of these saved games/clips.

The user may be able to share a saved game with more than one user. For example, a user may share a saved game A with multiple users (e.g., friends) to show the user's saved gaming session.

Figure 4:
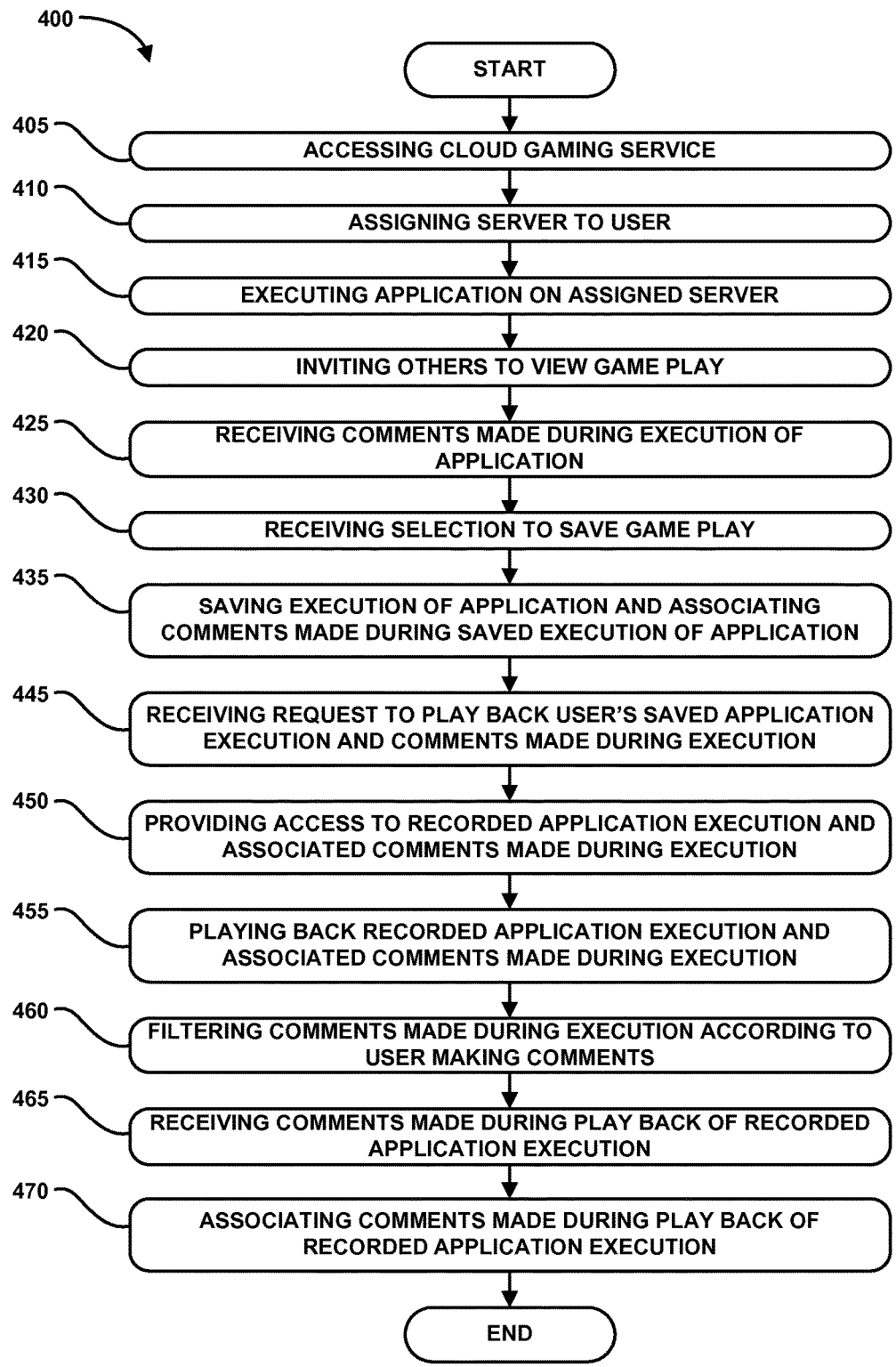
FIG. 4 is a flowchart diagram that illustrates the method operations performed in the asynchronous saving one or more play back viewer's comments to a previously recorded gaming session, for implementing embodiments of the present disclosure.

FIG. 4 is a flowchart diagram that illustrates the method operations 400 performed in the asynchronous saving one or more play back viewer's comments to a previously recorded gaming session, for implementing embodiments of the present disclosure. In an operation 405, a first user accesses a cloud gaming system cloud controller 130. The authorization manager 135 confirms the first user has a valid account and the first user's authorized access by querying the user account database 133 and comparing the first user's login access information to the first user's account information in the user account data base 133. The first user can access the cloud controller via a client device 122A-n.

The cloud controller 130 assigns the first user to a server/game console 113A, in an operation 410. In one implementation, assigning the first user to a server/game console 113A can include automatically loading one or more of the first user's previously saved games on the assigned server/game console. Assigning the server/game console 113A to the first user can also include displaying the first user's cloud gaming system dashboard 350 screen via the user's client device 122A-n and corresponding display 112A'-n'.

In one implementation the game console manager can assign the first user to a server/game console 113A. The cloud controller performs the authorization and the game console manager activates the server/game console (e.g., apply power), transfers any needed data such as game data, user data, etc., and trigger a login sequence to the assigned server/game console. Alternatively, the assigned server/game console can retrieve any needed data such as game data, user data, etc. from the corresponding storage locations as indicated by the user data and/or the game console manager and/or the cloud controller 130.

In an operation 415, the first user selects and executes a game or an application on the assigned server/game console 113A. The assigned server/game console 113A can be one of many servers/game consoles in one or more cloud gaming servers. In one implementation, the first user's assigned server/game console 113A can be limited to a timeshare of a server/game console, where the first user is allocated only a portion of the operating time of the assigned server/game console 113A. The server/game console 113A can provide one or more timeshares, each of the timeshares can be assigned to respective user, thus allowing multiple users to use a single server/game console at the same time.

In an operation 420, the first user can allow one or more other users or spectators, e.g., friends, observe the first user's gaming session. In an operation 425 and during the gaming session, the first user and the one or more other users or spectators can provide written and audible comments to the gaming session.

In an operation 430, the first user selects to save the current gaming session in the game/application. For example, the first user could initiate the save request at the beginning or during any portion of the gaming session. In one implementation, the cloud gaming system can automatically save the gaming session from the beginning of the gaming session or within a preselected rolling window such as a window encompassing the last 10 seconds to 30 minutes, or more, of gaming session as may be selected automatically or as may be set by the user in the user's preferences. In such an implementation, when the first user selects to save the gaming session, the first user can also select how far back in gaming session time to begin saving the gaming session. This implementation allows the first user to decide to save a gaming session of a significant event, after the significant event occurs in the gaming session so that the first user can share the gaming session of the significant event with one or more friends.

The first user can initiate the save game by communicating the save request to one or both of the cloud controller 130 and the first user's assigned server/game console 113A via the user's client device 122A-n and/or his game controller 123A-n. As noted above, the save game operations may be distributed among the assigned game console, the game console manager, the cloud controller 130 and the streaming software.

In an operation 435, the first user's current gaming session 114 and the comments made by the first user and any other users are saved for later retrieval and play back. The saved gaming session 114 can include other data such as hardware state data and/or application state data. The user and/or spectator comments information can be saved as part of the saved gaming session. Alternatively, the user and/or spectator comments information can be saved in separate data files and associated in time to the saved gaming session or clip. User identification corresponding to each of the saved comments, real time and date stamp of each of the saved comments and associations to time points within the gaming session corresponding when each of the comments were made.

As described above, the saved first user's gaming session 114 and associated comments can be stored as stored gaming session 114' in the local storage server 116 and/or in the storage server 110. The storage server 110 and the local storage server 116 can efficiently store saved gaming session for multiple game consoles and/or multiple users. In an operation 440, the location of the first user's stored gaming session 114' is associated with the first user's account data in the user account data base 133. This allows the first user's account information to include the storage location of the first user's stored gaming sessions.

At some later time, and in an operation 445, a request to play back the first user's saved gaming session is initiated. The play back request can originate from the first user or an authorized second user such as a friend. Referring again to the above example, John can save his gaming session and Henry can access the saved gaming session at some later time. The first user or an authorized second user can issue the play back request via the user's client device 122A-n and through an assigned server/game console such as server/game console 113B.

If the first user had logged off his initial gaming session or his initial gaming session was otherwise interrupted such as the cloud controller terminating the initial gaming session or the first user experiencing an interruption in the network connection to the cloud gaming server 130 or to the game console manager 113 or to the assigned server/game console, then the first user and/or authorized second users may be required to re-access the cloud gaming service and be assigned a server/game console, as described in operation 405 above. When the first user and/or authorized second users are assigned a server/game console 113B, one or more of the first user's saved games may be automatically loaded on the assigned server/game console. When the first user is assigned a server/game console 113B and one of the first user's saved games are loaded on the assigned server/game console, the assigned server/game console may provide an indication to the first user that the saved game is ready for play back and provide access for the first user to view the stored game and the corresponding comments by each of the users viewing the saved gaming session such as through the user's cloud gaming dashboard described above.

The first user can also share, or send the stored gaming session 114' or otherwise authorize access to the stored gaming session 114' to the second user as described above. The request to play back the game can be received in the cloud controller 130 from an assigned server/game console, e.g., server/game console 113B or the client device 122A-E.

Upon receiving the play back request, the cloud controller 130 queries the first user's account information in the user account database 133 to determine the storage location of the saved first user's gaming session 114', in an operation 450. The cloud controller 130 and/or the game console manager 113 can retrieve the saved first user's gaming session 114' and begin streaming the saved first user's gaming session 114' to the requesting server/game console 113B, in an operation 450. In an operation 455, the requesting server/game console 113B receives the streaming saved first user's gaming session 114' to the user's client device 122A-n.

In an operation 460, the comments saved with the first user's saved gaming session are filtered so that the play back requesting user only receives or views the comments the viewing user is authorized to receive or view In an operation 465, the play back requesting user can make additional comments to the play back of the first user's saved gaming session. The play back requesting user's additional comments can be saved and associated with the comments saved with the previously saved first user's gaming session, in an operation 475, and the method operations can end.

Figure 5:
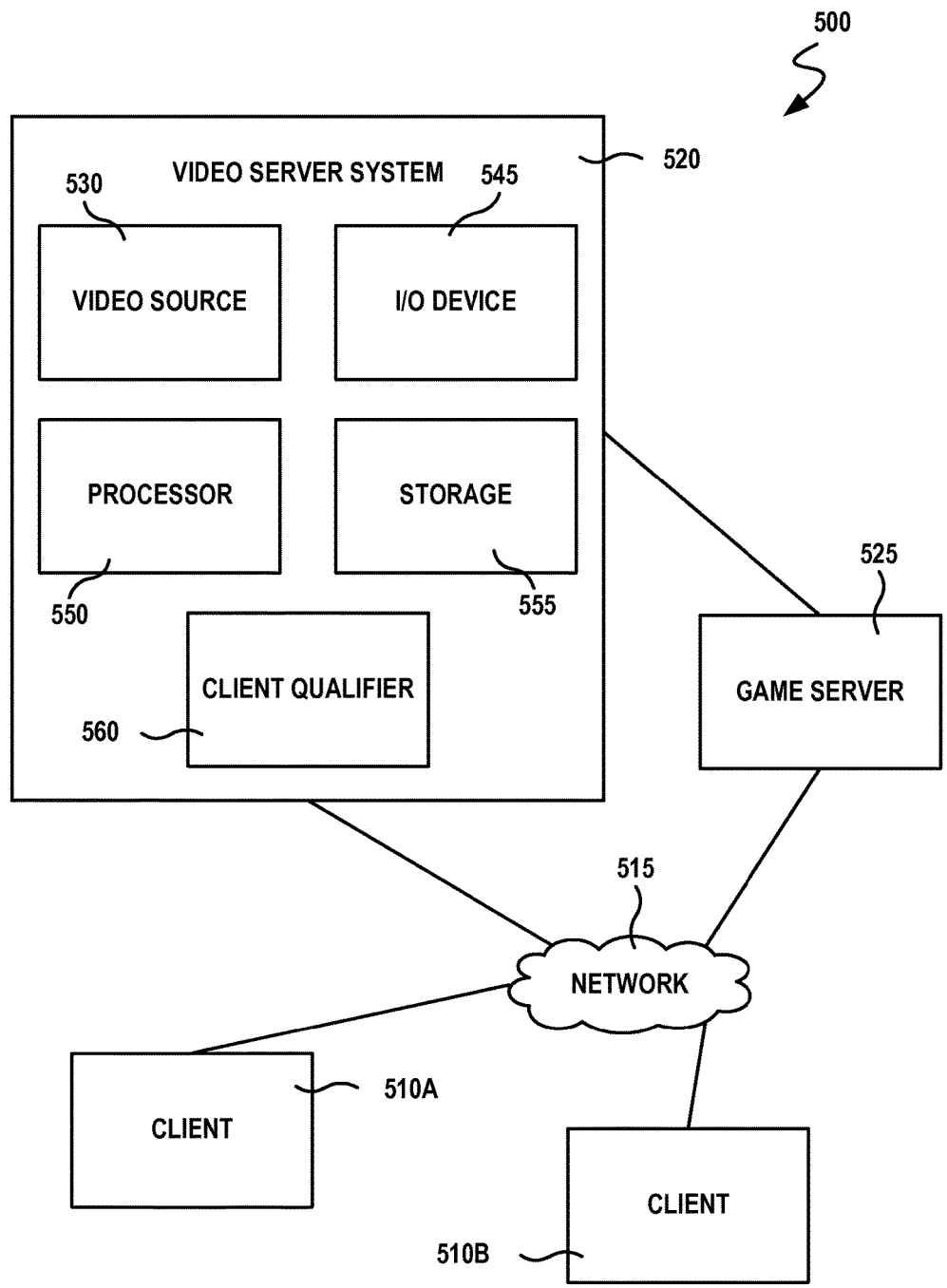
FIG. 5 is a block diagram of a Game System, according to various embodiments of the invention.

FIG. 5 is a block diagram of a Game System 500, according to various embodiments of the invention. Game System 500 is configured to provide a video stream to one or more Clients 510 via a Network 515. Game System 500 typically includes a Video Server System 520 and an optional game server 535. Video Server System 520 is configured to provide the video stream to the one or more Clients 510 with a minimal quality of service. For example, Video Server System 520 may receive a game command that changes the state of or a point of view within a video game, and provide Clients 510 with an updated video stream reflecting this change in state with minimal lag time. The Video Server System 520 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the invention.

Clients 510, referred to herein individually as 510A, 510B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 510 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 510 or on a separate device such as a monitor or television. Clients 510 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 510 are optionally geographically dispersed. The number of clients included in Game System 500 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the Video Server System 520 to deliver a game viewed through the HMD. In one embodiment, the game console receives the video stream from the Video Server System 520, and the game console forwards the video stream, or updates to the video stream, to the HMD for rendering.

Clients 510 are configured to receive video streams via Network 515. Network 515 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 510 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 510 may, but are not required to, further include systems configured for modifying received video. For example, a client may be configured to perform further rendering, to overlay one video image on another video image, to crop a video image, and/or the like. For example, Clients 510 may be configured to receive various types of video frames, such as I-frames, P-frames and B-frames, and to process these frames into images for display to a user. In some embodiments, a member of Clients 510 is configured to perform further rendering, shading, conversion to 3-D, or like operations on the video stream. A member of Clients 510 is optionally configured to receive more than one audio or video stream. Input devices of Clients 510 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 510 is generated and provided by Video Server System 530. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 510 are typically configured to receive inputs from a user. These inputs may include game commands configured to change the state of the video game or otherwise affect game play. The game commands can be received using input devices and/or may be automatically generated by computing instructions executing on Clients 510. The received game commands are communicated from Clients 510 via Network 515 to Video Server System 520 and/or Game Server 535. For example, in some embodiments, the game commands are communicated to Game Server 525 via Video Server System 530. In some embodiments, separate copies of the game commands are communicated from Clients 510 to Game Server 525 and Video Server System 520. The communication of game commands is optionally dependent on the identity of the command. Game commands are optionally communicated from Client 510A through a different route or communication channel that that used to provide audio or video streams to Client 510A. It should be understood that the Game Server 525 can include portions of the cloud controller 130 and/or the game manager 113 as described above.

Game Server 525 is optionally operated by a different entity than Video Server System 530. For example, Game Server 525 may be operated by the publisher of a multi-player game. In this example, Video Server System 520 is optionally viewed as a client by Game Server 525 and optionally configured to appear from the point of view of Game Server 525 to be a prior art client executing a prior art game engine. Communication between Video Server System 520 and Game Server 525 optionally occurs via Network 515. As such, Game Server 525 can be a prior art multiplayer game server that sends game state information to multiple clients, one of which is game server system 530. Video Server System 520 may be configured to communicate with multiple instances of Game Server 525 at the same time. For example, Video Server System 520 can be configured to provide a plurality of different video games to different users. Each of these different video games may be supported by a different Game Server 525 and/or published by different entities. In some embodiments, several geographically distributed instances of Video Server System 520 are configured to provide game video to a plurality of different users. Each of these instances of Video Server System 520 may be in communication with the same instance of Game Server 525. Communication between Video Server System 520 and one or more Game Server 525 optionally occurs via a dedicated communication channel. For example, Video Server System 520 may be connected to Game Server 525 via a high bandwidth channel that is dedicated to communication between these two systems.

Video Server System 520 comprises at least a Video Source 530, an I/O Device 545, a Processor 550, and non-transitory Storage 555. Video Server System 520 may include one computing device or be distributed among a plurality of computing devices. These computing devices are optionally connected via a communications system such as a local area network.

Video Source 530 is configured to provide a video stream, e.g., streaming video or a series of video frames that form a moving picture. In some embodiments, Video Source 530 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 525. Game Server 525 may maintain a copy of the state of the game based on game commands received from multiple players using geographically disperse clients. In these cases, the game state is provided by Game Server 525 to Video Source 530, wherein a copy of the game state is stored and rendering is performed. Game Server 525 may receive game commands directly from Clients 510 via Network 515, and/or may receive game commands via Video Server System 530.

Video Source 530 typically includes rendering logic, e.g., hardware, firmware, and/or software stored on a computer readable medium such as Storage 555. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 510. For example, the raw video may be encoded according to an Adobe Flash® standard, H.264X (such as H.264, H.265 and similar), H.363, On3, VP6, VC-1, WMA, Huffyuv, Lagarith, MPG-x. Xvid. FFmpeg, x364, VP6-8, realvideo, or the like. The encoding process produces a video stream that is optionally packaged for delivery to a decoder on a remote device. The video stream is characterized by a frame size and a frame rate. Typical frame sizes include 800×600, 1380×730 (e.g., 730p), 1034×768, although any other frame sizes may be used. The frame rate is the number of video frames per second. A video stream may include different types of video frames. For example, the H.364 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 530 includes a video recording device such as a camera. This camera may be used to generate delayed or live video that can be included in the video stream of a computer game. The resulting video stream, optionally includes both rendered images and images recorded using a still or video camera. Video Source 530 may also include storage devices configured to store previously recorded video to be included in a video stream. Video Source 530 may also include motion or positioning sensing devices configured to detect motion or position of an object, e.g., person, and logic configured to determine a game state or produce video-based on the detected motion and/or position.

Video Source 530 is optionally configured to provide overlays configured to be placed on other video. For example, these overlays may include a command interface, log in instructions, messages to a game player, images of other game players, video feeds of other game players (e.g., webcam video). In embodiments of Client 510A including a touch screen interface or a gaze detection interface, the overlay may include a virtual keyboard, joystick, touch pad, and/or the like. In one example of an overlay a player's voice is overlaid on an audio stream. Video Source 530 optionally further includes one or more audio sources.

In embodiments wherein Video Server System 520 is configured to maintain the game state based on input from more than one player, each player may have a different point of view comprising a position and direction of view. Video Source 530 is optionally configured to provide a separate video stream for each player based on their point of view. Further, Video Source 530 may be configured to provide a different frame size, frame data size, and/or encoding to each of Client 510. Video Source 530 is optionally configured to provide 3-D video.

I/O Device 545 is configured for Video Server System 520 to send and/or receive information such as video, commands, requests for information, a game state, gaze information, device motion, device location, user motion, client identities, player identities, game commands, security information, audio, and/or the like. I/O Device 545 typically includes communication hardware such as a network card or modem. I/O Device 545 is configured to communicate with Game Server 535, Network 515, and/or Clients 510.

Processor 550 is configured to execute logic, e.g. software, included within the various components of Video Server System 520 discussed herein. For example, Processor 550 may be programmed with software instructions in order to perform the functions of Video Source 530, Game Server 535, and/or a Client Qualifier 560. Video Server System 520 optionally includes more than one instance of Processor 550. Processor 550 may also be programmed with software instructions in order to execute commands received by Video Server System 520, or to coordinate the operation of the various elements of Game System 500 discussed herein. Processor 550 may include one or more hardware device. Processor 550 is an electronic processor.

Storage 555 includes non-transitory analog and/or digital storage devices. For example, Storage 555 may include an analog storage device configured to store video frames. Storage 555 may include a computer readable digital storage, e.g. a hard drive, an optical drive, or solid state storage. Storage 515 is configured (e.g. by way of an appropriate data structure or file system) to store video frames, artificial frames, a video stream including both video frames and artificial frames, audio frame, an audio stream, and/or the like. Storage 555 is optionally distributed among a plurality of devices. In some embodiments, Storage 555 is configured to store the software components of Video Source 530 discussed elsewhere herein. These components may be stored in a format ready to be provisioned when needed.

Video Server System 520 optionally further comprises Client Qualifier 560. Client Qualifier 560 is configured for remotely determining the capabilities of a client, such as Clients 510A or 510B. These capabilities can include both the capabilities of Client 510A itself as well as the capabilities of one or more communication channels between Client 510A and Video Server System 530. For example, Client Qualifier 560 may be configured to test a communication channel through Network 515.

Client Qualifier 560 can determine (e.g., discover) the capabilities of Client 510A manually or automatically. Manual determination includes communicating with a user of Client 510A and asking the user to provide capabilities. For example, in some embodiments, Client Qualifier 560 is configured to display images, text, and/or the like within a browser of Client 510A. In one embodiment, Client 510A is an HMD that includes a browser. In another embodiment, client 510A is a game console having a browser, which may be displayed on the HMD. The displayed objects request that the user enter information such as operating system, processor, video decoder type, type of network connection, display resolution, etc. of Client 510A. The information entered by the user is communicated back to Client Qualifier 560.

Automatic determination may occur, for example, by execution of an agent on Client 510A and/or by sending test video to Client 510A. The agent may comprise computing instructions, such as java script, embedded in a web page or installed as an add-on. The agent is optionally provided by Client Qualifier 560. In various embodiments, the agent can find out processing power of Client 510A, decoding and display capabilities of Client 510A, lag time reliability and bandwidth of communication channels between Client 510A and Video Server System 530, a display type of Client 510A, firewalls present on Client 510A, hardware of Client 510A, software executing on Client 510A, registry entries within Client 510A, and/or the like.

Client Qualifier 560 includes hardware, firmware, and/or software stored on a computer readable medium. Client Qualifier 560 is optionally disposed on a computing device separate from one or more other elements of Video Server System 530. For example, in some embodiments, Client Qualifier 560 is configured to determine the characteristics of communication channels between Clients 510 and more than one instance of Video Server System 530. In these embodiments the information discovered by Client Qualifier can be used to determine which instance of Video Server System 520 is best suited for delivery of streaming video to one of Clients 510.

This application is related to and hereby incorporates by reference in its entirety and for all purposes U.S. patent application Ser. No. 12/370,327 filed on Feb. 12, 2009 and entitled "System and method for Automated Creation of Video Game Highlights," which is incorporated herein by reference in its entirety for all purposes. This application is related to and hereby incorporates by reference in its entirety and for all purposes U.S. patent application Ser. No. 13/365,140 filed on Feb. 2, 2012 and entitled "Methods for Identification of Highlight Game Events and Automated Generation of Videos for Same," which is incorporated herein by reference in its entirety for all purposes.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the described embodiments.

What is claimed is:

1. A method of asynchronous commenting on a gaming session, comprising:

recording, by a processor, the gaming session that is executed by a cloud gaming system, the recording producing a game play clip that includes a video recording of a gaming session and an audio recording that includes both a player participating in the gaming session and a spectator remotely observing via a live stream of the gaming session to enable commenting by the spectator for the player to hear while the player participates in the gaming session, wherein the game play clip includes a portion of the recorded game session and a portion of the audio recording that corresponds to the game play clip, the game play clip includes one or more highlight events of play occurring within the gaming session;

enabling, by the processor of the cloud gaming system, sharing of the game play clip to a website to enable viewing by users of the website; and providing, by the processor of the cloud gaming system, playback of the game play clip in response to selection of the game play clip by a playback viewing user of the website, the playback including the portion of the recorded game session and the portion of the audio recording, the portion of the audio recording having one or more comments that relate to the highlight events that occurred during the gaming session;

filtering out the one or more comments to be output with the audio recording during the playback of the game play clip based on a social network relation of the playback viewing user and the spectator, such that comments of the spectator that observed the gaming session live has comments filtered out by the cloud gaming system if the playback viewing user does not has a social network relation with the spectator;

wherein the comments are identified as provided by the player participating in the gaming session and the spectator observing the player.

2. The method of claim 1, further comprising, determining if the playback viewing user of the website has the social network relation by being a friend of the spectator in a social networking site;

wherein being a friend is determined from a social graph of relationships managed by the website or obtained from the social networking site.

3. The method of claim 1, further comprising, receiving, during playback of the game play clip, audio recording of a viewing user accessing the shared game play clip;

associating a portion of the audio recording of the playback viewing user to the game play clip, the portion of the audio recording of the playback viewing user includes one or more comments that relate to the highlight events or comments of the player or the spectator;

continuing to share the game play clip, the shared game play clip including the associated portion of the audio recording of the playback viewing user;

wherein the comments of the playback viewing user are identified as provided by the playback viewing user.

4. The method of claim 3, further comprising, continuing to filter out comments of the spectator or other spectators that have viewed the game play clip after an initial recording of the audio recording, the filtering out based on whether a friend relationship is present between the playback viewing user and the spectator or other spectators, the friend relationship being determined by a social graph managed by the website or obtained from a social networking site.

5. The method of claim 1, further comprising,
receiving, during playback of the game play clip, audio recording of a plurality of playback viewing users that accessed the shared game play clip;
enabling associating of portions of audio recordings of the plurality of playback viewing users to the game play clip, the portions of the audio recordings of the plurality of playback viewing users include one or more comments that relate to the highlight events or verbal comments of the player or the spectator;
continuing to share the game play clip, the shared game play clip including any of the associated portions of the audio recordings of the plurality of playback viewing users, wherein the comments of the plurality of playback viewing users are identified as provided by the respective playback viewing users;
filtering the comments of the spectator and the plurality of playback viewing users based on whether a friend relationship is present between a respective one of the plurality of playback viewing users and the spectator, the friend relationship being determined by a social graph managed by the website or obtained from a social networking site.

6. The method of claim 1, wherein the audio recording of at least one player includes a player text identification data identifying the at least one player and a player text comments file of verbal and written comments made by at least one player, the audio recording of the at least one spectator includes a spectator text identification data identifying the at least one spectator and a spectator text file of verbal and written comments made by the at least one spectator,
receiving a playback request to replay the recorded gaming session, the playback request being received from a client device corresponding to a second spectator,
replaying the recorded gaming session, and
recording the replayed recorded gaming session as a first updated recorded gaming session including an association on an audio recording of the second spectator as the second spectator observed the replayed gaming session, the audio recording of the second spectator includes a second spectator text identification data identifying the second spectator and a second spectator text file of verbal and written comments made by the second spectator, the audio recording of the second spectator observing the replayed gaming session being aligned in time with corresponding action occurring in the replayed gaming session.

7. The method of claim 6, wherein the player text file of verbal comments made by the player includes,
a player voice recognition identifying the verbal comments of the player, and
a player voice recognition output of the verbal comments made by the player.

8. A cloud gaming system for associating asynchronous comments to a gaming session hosted on the cloud gaming system comprising:
a server for hosting a cloud gaming session, the server being coupled to a player's client device via a network, the server being configured to receive control inputs from the player's client device and to execute the cloud gaming session according to the received control inputs, the server being coupled to a spectator's client device via the network and being configured to streamed video of the executed the cloud gaming session to the player's client device and the spectator's client device;
a game recorder logic included in the server being configured to record a game play clip including,
a video recording of the streamed video of the gaming session,
an audio recording of the player participating in the gaming session, and
an audio recording of a spectator observing the player participating in the gaming session, the audio recording of the spectator observing the player capturing live comments regarding game play of the player participating in the gaming session, the live comments provided for the player to hear while participating in the gaming session,
the game recorder logic being configured to associate the audio recording of the player and the audio recording of the spectator with the streamed video of the executed the cloud gaming session;
the server being configured to share the game play clip to a website according to the control inputs received from the player's client device,
a video playback logic for streaming a playback of the game play clip in response to selection of the game play clip by a playback viewing user of the website, the playback including a portion of a recorded game session and the portion of the audio recording, the portion of the audio recording having one or more comments that relate to highlight events that occurred during the gaming session, the playback of the game play clip including one or more comments to be output with the audio recording during the playback of the game play clip, wherein the comments are identified as provided by the player participating in the gaming session or the spectator observing the player;
sharing logic configured for determining if the playback viewing user of the website is a friend of the spectator and including in the portion of the audio recording corresponding to the spectator when it is determined that the spectator is a friend of the playback viewing user so that the cloud gaming system does not filter out comments of the spectator, wherein being a friend is determined from a social graph of relationships managed by the website or obtained from a social networking site.

9. The system of claim 8, wherein the server is configured to receive, during playback of the game play clip, an audio recording of a viewing user accessing the shared game play clip and associating a portion of the audio recording of the playback viewing user to the game play clip, the portion of the audio recording of the playback viewing user includes one or more comments that relate to the highlight events or comments of the player or the spectator.

10. The system of claim 9 wherein the server is configured to continue to share the game play clip, the shared game play clip including the associated portion of the audio recording of the playback viewing user, wherein the comments of the playback viewing user are identified as provided by the playback viewing user.

11. The system of claim 10, wherein the sharing logic is configure to filter views of the comments of the spectator based on whether a friend relationship is present between the playback viewing user and the spectator, the friend relationship being determined by a social graph managed by the website or obtained from a social networking site.

12. The system of claim 8, wherein the server is configured to receive, during playback of the game play clip, an audio recording of a plurality of playback viewing users that accessed the shared game play clip and enable association of portions of audio recordings of the plurality of playback viewing users to the game play clip, the portions of the audio recordings of the plurality of playback viewing users include one or more comments that relate to the highlight events or verbal comments of the player or the spectator and continuing to share the game play clip, the shared game play clip including any of the associated portions of the audio recordings of the plurality of playback viewing users, wherein the comments of the plurality of playback viewing users are identified as provided by the respective playback viewing users and filter views of the comments of the spectator and the plurality of playback viewing users based on whether a friend relationship is present between a respective one of the plurality of playback viewing users and the spectator, the friend relationship being determined by a social graph managed by the website or obtained from a social networking site.

13. The system of claim 8, wherein the audio recording of the at least one player includes a player text identification data identifying the at least one player and a player text comments file of verbal and written comments made by the at least one player, the audio recording of the at least one spectator includes a spectator text identification data identifying the at least one spectator and a spectator text file of verbal and written comments made by the at least one spectator, receiving a playback request to replay the recorded gaming session, the playback request being received from a client device corresponding to a second spectator, replaying the recorded gaming session, and recording the replayed recorded gaming session as a first updated recorded gaming session including an association on an audio recording of the second spectator as the second spectator observed the replayed gaming session, the audio recording of the second spectator includes a second spectator text identification data identifying the second spectator and a second spectator text file of verbal and written comments made by the second spectator, the audio recording of the second spectator observing the replayed gaming session being aligned in time with corresponding action occurring in the replayed gaming session.

14. The system of claim 13, wherein the player text file of verbal comments made by the at least one player includes, a player voice recognition identifying the verbal comments of the at least one player, and a player voice recognition output of the verbal comments made by the at least one player.

\* \* \* \* \*